United States Patent [19]

Kitahara et al.

[11] Patent Number: 4,604,666
[45] Date of Patent: Aug. 5, 1986

[54] DATA TRANSFER APPARATUS FOR USE WITH A MAGNETIC DISK CARTRIDGE

[75] Inventors: Toshihiro Kitahara; Yasushi Noda, both of Tokyo, Japan

[73] Assignee: Teac Corporation, Tokyo, Japan

[21] Appl. No.: 676,005

[22] Filed: Nov. 30, 1984

[30] Foreign Application Priority Data

Nov. 30, 1983 [JP] Japan .............................. 58-225569

[51] Int. Cl.$^4$ ............................................. G11B 17/04
[52] U.S. Cl. ...................................... 360/99; 360/97; 360/105; 360/133
[58] Field of Search ................... 360/99, 97, 105, 104, 360/90, 93, 96.5, 96.6, 96.3, 133

[56] References Cited

U.S. PATENT DOCUMENTS 4,065,800 12/1977 Wilson et al. ....................... 360/96.5
4,445,155 4/1984 Takahashi et al. ..................... 360/99
4,539,613 9/1985 Suyama et al. ........................ 360/99

Primary Examiner—John H. Wolff
Assistant Examiner—Matthew J. Bussan
Attorney, Agent, or Firm—Woodcock Washburn Kurtz Mackiewicz & Norris

[57] ABSTRACT

A data transfer apparatus employs a pair of magnetic transducer heads for contact with the opposite faces of a magnetic disk for data transfer. The magnetic disk is rotatably housed in a relatively rigid envelope to make up an interchangeable disk cartridge, with the envelope having a shutter openable to expose parts of the opposite faces of the magnetic disk for data transfer contact with the transducer heads. The apparatus has a cartridge cradle movable between a first position where the disk cartridge is loaded on and unloaded from the same, and a second position where the loaded disk cartridge engages wtih a disk drive mechanism to be driven thereby. The cartridge cradle is dually locked against accidental travel from the first to the second position, in order to prevent the collision of the pair of transducer heads with each other. As the second locking mechanism, in addition to the first which is normally employed for latching the cartridge cradle in the first position, a lever for opening the shutter of the disk cartridge is adapted to positively lock the cradle in the first position even if the first locking mechanism is tripped accidentally.

8 Claims, 15 Drawing Figures

DATA TRANSFER APPARATUS FOR USE WITH A MAGNETIC DISK CARTRIDGE

BACKGROUND OF THE INVENTION

Our invention relates to an apparatus for data transfer with a flexible magnetic disk contained in a protective envelope to make up a magnetic disk cartridge, and more specifically to such an apparatus of the type having a pair of magnetic transducer heads for data transfer contact with the opposite faces of a magnetic disk. The data transfer apparatus of our invention is particularly well suited for use with magnetic disks of the class known as "microfloppy disks", which are housed in relatively rigid envelopes having openable shutters to expose parts of the enclosed disks.

The "microfloppy disks" have been known and used extensively which have magnetic disks with diameters of 76 or 86 millimeters rotatably housed in relatively rigid envelopes. The disk cartridges of this class find use with data transfer apparatus, commonly referred to as disk drives or files, having a movable cartridge cradle for receiving a disk cartridge therein. The cartridge cradle travels between a retracted position where the disk cartridge is to be loaded on and unloaded from the cradle, and a working position where the loaded disk cartridge has its disk revolved for processing signals by transducing operation with a magnetic head or heads. Normally locked in the retracted position, the cartridge cradle becomes unlocked upon insertion of the disk cartridge therein and automatically travels with the loaded disk cartridge to the working position.

As heretofore constructed, the cradle locking mechanism has been composed of a locking lever and a pin engageable in a recess in the locking lever. The locking lever is sprung into engagement with the pin to normally hold the cartridge cradle in the retracted position. We object to this known locking mechanism as the locking lever is easy to disengage the pin owing to shocks or vibrations that may be exerted on the apparatus during, for example, its transportation. Such accidental tripping of the locking mechanism presents a problem particularly in conjunction with apparatus of the type having a pair of magnetic transducer heads arranged opposite each other for data transducing contact with the opposite faces of the magnetic disk. The tripping of the locking mechanism when no disk cartridge is loaded in the apparatus has so far resulted directly in the collision of the magnetic heads and, possibly, in their destruction.

SUMMARY OF THE INVENTION

We aim, therefore, at the provision of an improved data transfer apparatus employing an interchangeable disk cartridge, so made that the cartridge cradle is dually locked against accidental travel from the retracted to the working position, thereby practically preventing the collision of the pair of transducer heads with each other.

Stated briefly, the improved data transfer apparatus in accordance with our invention comprises a disk drive mechanism mounted on a base structure and having a drive hub for driving engagement with the magnetic disk of a disk cartridge. A pair of magnetic transducer heads are disposed substantially opposite with each other, normally with a spacing therebetween, for data transfer contact with the opposite faces of the magnetic disk. Also mounted on the base structure is a cartridge cradle movable between a first position, where the disk cartridge is to be loaded on and unloaded from the cartridge cradle, and a second position where the loaded disk cartridge engages with the drive hub of the disk drive mechanism to be driven thereby. The movement of the cartridge cradle between the first and second positions is effected by a cradle transport mechanism including resilient means acting to bias the cartridge cradle from the first toward the second position. The cartridge cradle is normally dually locked in the first position, by a first locking mechanism acting on the cradle transport mechanism to hold the cartridge cradle in the first position against the bias of the resilient means, and by a second locking mechanism acting directly on the cartridge cradle. Both first and second locking mechanisms are tripped upon loading of the disk cartridge on the cartridge cradle. Also included is a head transport mechanism for causing at least one of the transducer heads to move toward the other transducer head, and hence for establishing data transfer contact of both transducer heads with the opposite faces of the magnetic disk of the loaded disk cartridge, when the cartridge cradle travels with the disk cartridge from the first to the second position upon tripping of both the first and the second locking mechanisms.

Thus the pair of transducer heads are not to collide with each other unless both the first and the second locking mechanisms are tripped.

The data transfer apparatus of our invention is herein disclosed as adapted for use with a disk cartridge of the type having a rigid envelope with an openable shutter to expose radial portions of the opposite faces of the magnetic disk for data transfer contact with the pair of transducer heads. In this embodiment, we have shown the first locking mechanism as being of generally prior art construction comprising a spring energized locking lever movable into and out of engagement with a pin on the cradle transport mechanism. As the second locking mechanism, then, we have utilized a shutter opening lever which is pivotally mounted on the cartridge cradle and which operates in response to the loading of the disk cartridge on the cartridge cradle for opening the shutter of the disk cartridge. The shutter opening lever is adapted to positively hold the cartridge cradle in the first position until it completely opens the shutter of the disk cartridge upon loading thereof on the cartridge cradle.

Accordingly, even though the first locking mechanism may become accidentally unlocked as by vibrations, the head transport mechanism is not to actuate the transducer heads into undesired engagement with each other as long as the second locking mechanism including the shutter opening lever remains engaged. It will be appreciated from the subsequent description of the preferred embodiment that the use of the shutter opening lever as a part of the second locking mechanism makes its construction extremely simple and makes unnecessary any major alteration of the existing parts of the data transfer apparatus.

The above and other features and advantages of our invention and the manner of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

General

Figure 1:
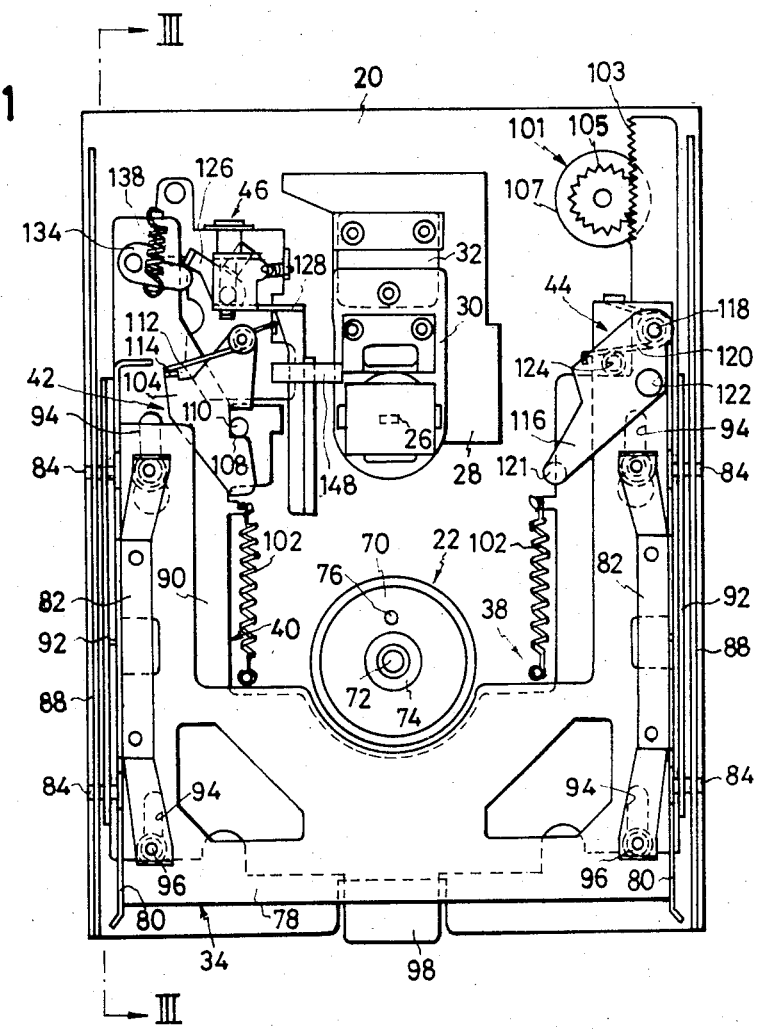
FIG. 1 is a top plan view of the data transfer apparatus constructed in accordance with the novel concepts of our invention, showing the various working components of the apparatus in a state when no magnetic disk cartridge is loaded therein.

We will first describe the general organization of the data transfer apparatus in accordance with our invention as adapted for use with a magnetic disk cartridge of the class generally referred to as the microfloppy disk. It will be seen from FIGS. 1 through 4 that the apparatus has a generally rectangular base structure 20 on which there is mounted a disk drive mechanism 22, FIGS. 1 and 2, for imparting rotation to the magnetic disk of an interchangeable disk cartridge, not shown in these figures, as the same is loaded in position in the apparatus in a manner yet to be described.

Arranged for data transducing contact with the opposite faces of the magnetic disk are a pair of magnetic transducer heads 24 and 26 disposed substantially opposite each other. In this particular embodiment, the first or lower magnetic head 24 is fixedly mounted on a carriage 28 whereas the second or upper magnetic head 26 is affixed to a head carrier 30 which is mounted on the carriage 28 via a cantilever spring 32. Normally held away from the lower magnetic head 24 against the bias of the cantilever spring 32, the upper magnetic head 26 is movable toward the lower magnetic head for the establishment of data transfer contact of both magnetic heads 24 and 26 with the magnetic disk. As is well known, the carriage 28 travels linearly to move the transducer heads 24 and 26 radially of the magnetic disk for track to track accessing. The known mechanism comprising an electric stepper motor and a rotary to linear converter, both not shown, may be employed for such travel of the magnetic heads in a radial direction of the magnetic disk.

Figure 2:
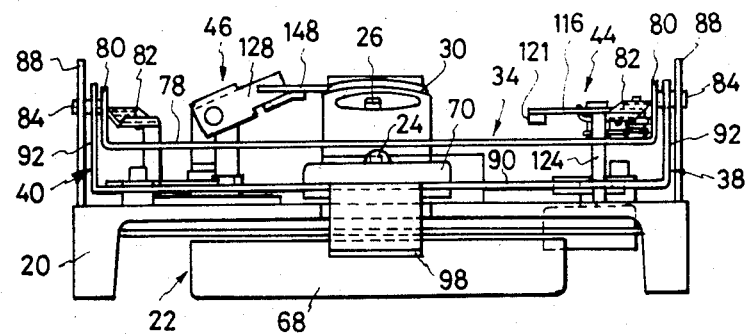
FIG. 2 is a front elevation of the data transfer apparatus of FIG. 1, also shown in a state when no disk cartridge is loaded therein.
Figure 3:
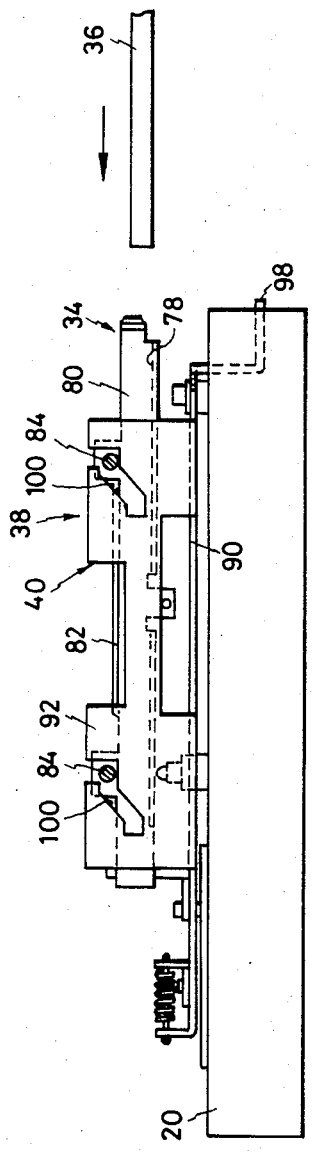
FIG. 3 is a vertical section through the data transfer apparatus, taken along the line III—III of FIG. 1 and also shown in a state when no disk cartridge is loaded therein.
Figure 6:
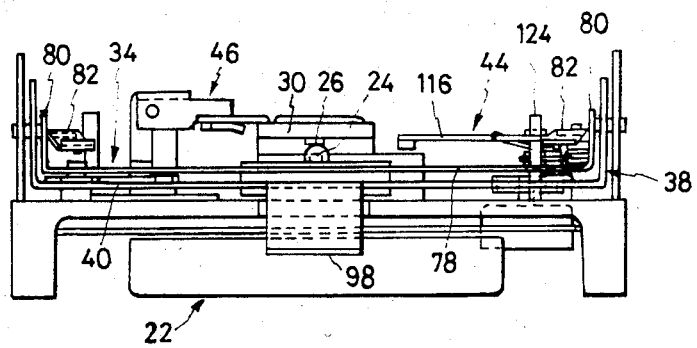
FIG. 6 is a view similar to FIG. 2 except that the apparatus is shown in a state when a magnetic disk cartridge, not shown here, is loaded in position therein.
Figure 7:
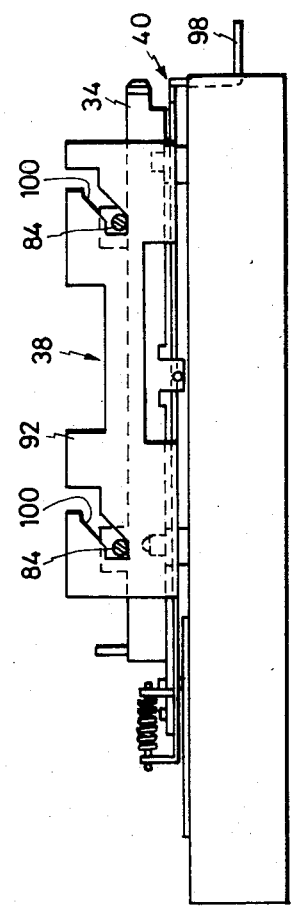
FIG. 7 is a view similar to FIG. 3 except that the apparatus is shown in a state when a magnetic disk cartridge, not shown here, is loaded in position therein.

At 34 there is shown a cartridge cradle movable up and down relative to the base structure 20 between a first or retracted position best seen in FIGS. 2 and 3 and a retracted or working position best seen in FIGS. 6 and 7. As illustrated in FIG. 3, the magnetic disk cartridge 36 is to be loaded on the cartridge cradle 34 when the same is in the retracted position. Subsequently moved to the working position together with the loaded disk cartridge 36, the cartridge cradle 34 is to hold the disk cartridge in engagement with the disk drive mechanism 22 to be driven thereby.

With reference to FIGS. 1 through 3 and 5 through 7, a cradle transport mechanism 38 operates to move the cartridge cradle 34 between the working and retracted positions. The cradle transport mechanism 38 includes a slide 40 slidably mounted on the base structure 20 for horizontal movement between a position of FIGS. 1 through 3 and that of FIGS. 5 through 7.

We provide two separate locking mechanisms for normally holding the cartridge cradle 34 in the retracted position of FIGS. 2 and 3 practically against any possibility of its accidental travel to the working position of FIGS. 6 and 7. The two locking mechanisms are a first locking mechanism 42 acting on the cradle transport mechanism 38, and a second locking mechanism 44 acting directly on the cartridge cradle 34. Both locking mechanisms 42 and 44 are tripped in response to the loading of the disk cartridge 36 on the cartridge cradle 34, allowing the latter to be transported with the loaded disk cartridge from the retracted to the working position by the cartridge transport mechanism 38.

The reference numeral 46 in FIGS. 1, 2, 5 and 6 generally denotes a head transport mechanism which is associated with only the upper magnetic head 26 in the illustrated embodiment. Normally holding the upper magnetic head 26 in the FIG. 2 position, the head transport mechanism 46 operates to move the upper magnetic head toward the lower magnetic head 24, as in FIG. 6, for the establishment of data transfer contact of both heads 24 and 26 with the opposite faces of the magnetic disk of the loaded disk cartridge 36 when the cartridge cradle 34 travels with the disk cartridge from the first to the second position upon tripping of both first 42 and second 44 locking mechanisms.

We will give hereafter a more extensive discussion of the above enumerated magnetic disk cartridge 36, disk drive mechanism 22, cartridge cradle 34, cradle transport mechanism 38, first locking mechanism 42, second locking mechanism 44, and head transport mechanism 46, in that order, followed by the operational description of the complete data transfer apparatus.

Magnetic Disk Cartridge

The magnetic disk cartridge 36 is illustrated in detail in FIGS. 9 through 12. It has a flexible magnetic disk 48 with a diameter of, typically, 86 millimeters rotatably housed in a relatively rigid plastic envelope or casing 50. The envelope 50 has a slidable shutter 52 normally closing a pair of rectangular apertures 54 which are cut in both sides of the envelope to expose radial portions of the opposite faces of the magnetic disk 48. The shutter 52 is sprung to the position of FIGS. 9 and 10, normally holding the apertures 54 closed. When slid to the left, as in FIG. 12, against the force of the unshown spring, the shutter 52 has its apertures 56 brought into register with the apertures 54 in the envelope 50, thereby exposing the radial portions of the opposite faces of the magnetic disk 48 for data transfer contact with the pair of magnetic heads 24 and 26. The envelope 50 has a recess 58 along a marginal edge thereof to allow the shutter 52 to be opened by means set forth subsequently.

The magnetic disk 48 has a hub 60 in the form of a metal made disk attached centrally thereto. The hub 60 is exposed through a circular aperture 62 defined in one of the opposite sides of the envelope 50 for both magnetic and positive engagement with the disk drive mechanism 22, as will be later explained in further detail in conjunction with the disk drive mechanism. The hub 60 has a concentric square opening 64 and an eccentric slot 66 defined therein.

Disk Drive Mechanism

Reference is directed to FIGS. 1 and 2 for a detailed description of the disk drive mechanism 22. It includes an electric motor 68, FIG. 2, mounted on the underside of the base structure 20 for rotation about an axis perpendicular to the base structure 20. The disk drive motor 68 has its output shaft coupled coaxially to a drive hub 70 which is adapted for driving engagement with the driven hub 60 of the magnetic disk 48. As will be seen from FIG. 1, the drive hub 70 has a spindle 72 and permanent magnet 74 formed coaxially thereon, and a drive button 76 arranged eccentrically thereon. The spindle 72 is intended for engagement in the central opening 64 in the driven hub 60 of the magnetic disk 48; the permanent magnet 74 for magnetically attracting the metal made driven hub 60; and the drive button 76 for engagement in the eccentric slot 66 in the driven hub 60. The driving engagement of the drive hub 70 with the driven hub 60 is of course established upon travel of the cartridge cradle 34 from the retracted position of FIGS. 2 and 3 to the working position of FIGS. 6 and 7 together with the disk cartridge 36 loaded thereon.

Cartridge Cradle

As will be understood from FIGS. 1 through 3, the cartridge cradle 34 is of generally U shaped cross section, comprising a web 78 and pair of flanges or side walls 80 fabricated from a single piece of sheet metal. The web 78 is disposed parallel to the base structure 20 for holding the disk cartridge 36 thereon, and the side walls 80 extend vertically upwardly from the opposite sides of the web. The cartridge cradle 34 is additionally provided with a pair of cartridge retainers 82 of resilient material. Affixed to the side walls 80 of the cartridge cradle 34 so as to overhang the web 78, the cartridge retainers 82 function to hold the loaded disk cartridge 36 against the drive hub 70 of the disk drive mechanism 22 as the cartridge cradle moves down to the working position of FIGS. 6 and 7.

Figure 4:
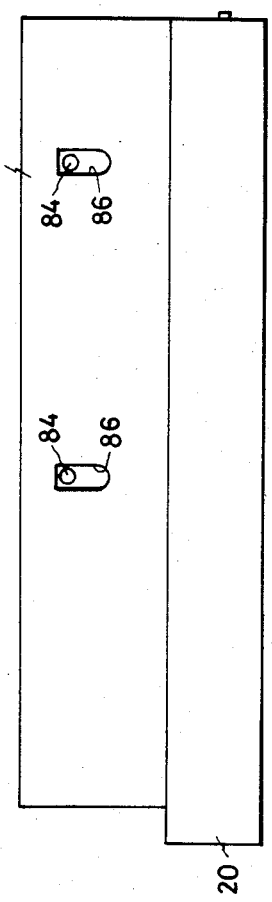
FIG. 4 is a left hand side elevation of the data transfer apparatus, also shown in a state when no disk cartridge is loaded therein.

We have mentioned that the cartridge cradle 34 travels between the retracted position of FIGS. 2 and 3 and the working position of FIGS. 6 and 7. For such up and down motion of the cartridge cradle 34 relative to the base structure 20, there are provided a pair of pins 84 projecting laterally from each side wall 80 of the cartridge cradle 34. As best seen in FIG. 4, the two pairs of pins 84 are slidably engaged respectively in guide slots 86 defined in a pair of upstanding guide walls 88 formed on and extending along the opposite side edges of the base structure 20. The guide slots 86 are elongated vertically, or parallel to the axis of the drive hub 70 of the disk drive mechanism 22, so that the cartridge cradle 34 travels up and down between the retracted and working positions as its pins 84 slide along the guide slots 86.

The pins 84 serve not only to guide the up and down motion of the cartridge cradle 34 but also as cam followers to effect such motion of the cartridge cradle, as will become apparent from the following description of the cradle transport mechanism 38. We will therefore refer to these pins 84 as cam follower pins.

Cradle Transport Mechanism

The cradle transport mechanism 38 for the up and down motion of the cartridge cradle 34 appears in FIGS. 1 through 3 and 5 through 7. The major component of the cradle transport mechanism 38 is the aforesaid slide 40 which, like the cartridge cradle 34, is of a single piece of sheet metal bent into U shaped cross section. Thus the slide 40 comprises a web 90 laid horizontally between the base structure 20 and the web 78 of the cartridge cradle 34, and a pair of upstanding flanges or side walls 92 interposed between the side walls 80 of the cartridge cradle and the guide walls 88 on the base structure. The web 90 of the slide 40 has defined therein two pairs of guide slots 94, FIG. 1, extending in the direction in which the disk cartridge 36 is to be inserted in the cartridge cradle 34 as in FIG. 3. Slidably engaged one in each guide slot 94 are a pair of guide pins 96 erected on the base structure 20. Consequently, the slide 40 travels horizontally relative to the base structure 20 and cartridge cradle 34 between the position of FIGS. 1 and 3 and that of FIGS. 5 and 7. The slide web 90 has an L shaped tongue 98 projecting generally forwardly therefrom for use as a handle or button in ejecting the loaded disk cartridge 36.

Employed for translating the horizontal reciprocation of the slide 40 into the vertical reciprocation of the cartridge cradle 34 between its retracted and working positions are the cam means best depicted in FIGS. 3 and 7. It will be observed from these figures than each upstanding flange 92 of the slide 40 has a pair of sloping cam grooves 100 defined therein. The noted cam follower pins 84 on the cartridge cradle 34 slidably engaged in these cam grooves 100 as they extend therethrough into sliding engagement in the guide slots 86 in the fixed guide walls 88 on the base structure 20.

Consequently, when the slide 40 lies in its normal or right hand position of FIG. 3, the cam follower pins 84 are in the highest positions of the sloping cam grooves 100, holding the cartridge cradle 34 in its retracted or raised position of FIGS. 2 and 3. Upon rightward travel of the slide 40, then, the cam follower pins 84 relatively slide down the cam grooves 100 to the position of FIG. 7, thereby causing the descent of the cartridge cradle 34 to its working position of FIGS. 6 and 7.

Figure 5:
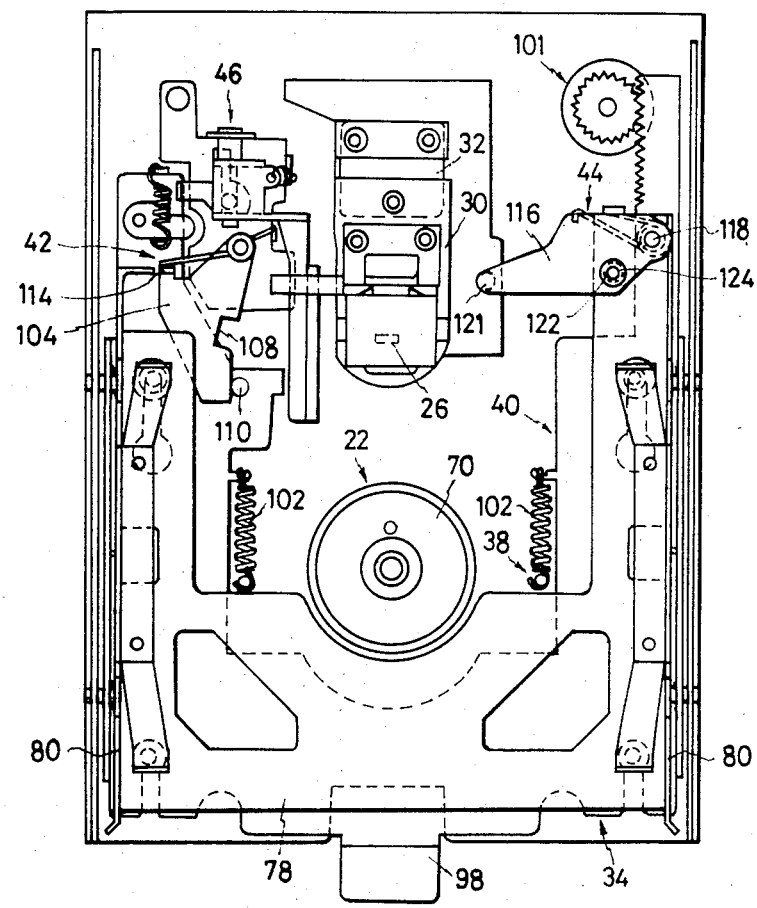
FIG. 5 is a view similar to FIG. 1 except that the various working components of the data transfer apparatus are shown in a state when a magnetic disk cartridge, not shown here, is loaded in position therein.

At 102 in FIGS. 1 and 5 are shown a pair of helical tension springs acting to bias the slide 40 from its FIGS. 1 and 3 position toward that of FIGS. 5 and 7 with respect to the base structure 20. It will therefore be understood that the tension springs 102 act to bias, via the slide 40, the cartridge cradle 34 from its retracted position of FIGS. 2 and 3 toward its working position of FIGS. 6 and 7.

Perhaps as an incidental feature of our invention, the slide 40 is provided with a retarder mechanism 101, FIGS. 1 and 5, for retarding or braking the travel of the slide 40 from its FIGS. 1 and 3 position to that of FIGS. 5 and 7 under the bias of the tension springs 102. The retarder mechanism 101 comprises a rack 103 formed as an extension of the slide 40 in the direction of its reciprocation. The rack 103 meshes with a pinion 105 coupled to an coil damper 107.

First Locking Mechanism

Figure 13:
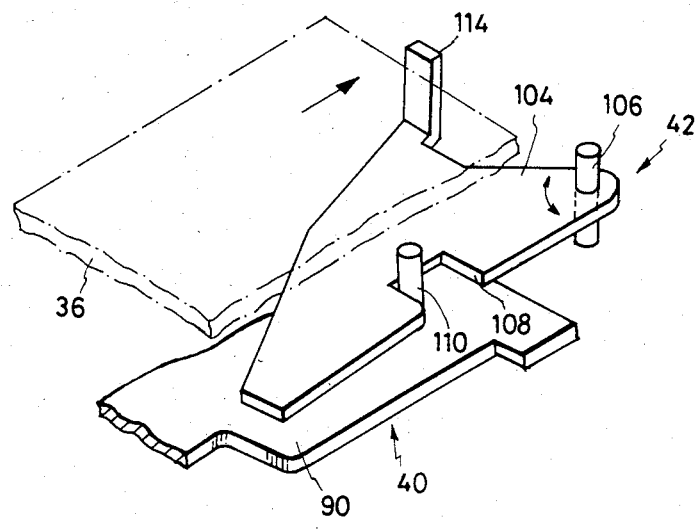
FIG. 13 is an enlarged, fragmentary perspective view of the first locking mechanism of the data transfer apparatus for normally holding the apparatus in the state of FIGS. 1 through 4.

While the first locking mechanism 42 for normally holding the slide 40 of the cradle transport mechanism 38 in the FIGS. 1 and 3 position against the forces of the tension springs 102 appears in both FIGS. 1 and 5, FIG. 13 better illustrates its constructional details on an enlarged scale. The first locking mechanism 42 comprises a locking lever 104 supported by a pivot pin 106 on the base structure 20 for pivotal motion about an axis parallel to the axis of the drive hub 70 of the disk drive mechanism 22. The locking lever 104 is recessed at 108 for engaging a pin 110 on the web 90 of the slide 40. Coiled around the pivot pin 106, a torsion spring 112 acts on the locking lever 104 to bias the same in a counterclockwise direction as viewed in FIGS. 1, 5 and 13. Thus the locking lever 104 normally engages the pin 110 on the slide 40 in its recess 108 under the bias of the torsion spring 112, thereby holding the slide 40 in FIGS. 1 and 3 position and hence the cartridge cradle 34 in the retracted position of FIGS. 2 and 3.

The locking lever 104 is formed to include an upstanding abutment 114. This abutment is to be struck by the leading edge of the disk cartridge 34 upon full insertion thereof in the cartridge cradle 34, as will be understood from FIGS. 3 and 13, with the result that the locking lever 104 is turned clockwise against the bias of the torsion spring 112. Thereupon the slide 40 is released from the locking lever 104.

Second Locking Mechanism

Figure 14:
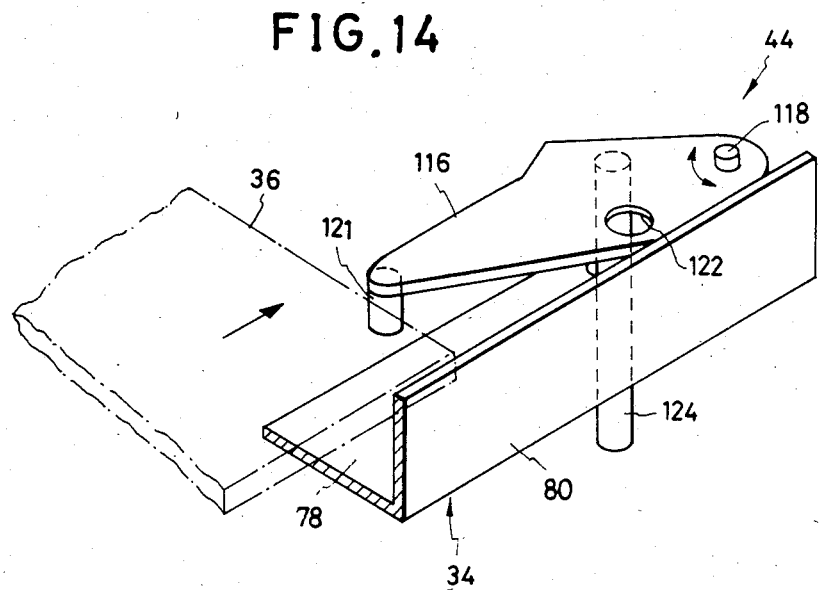
FIG. 14 is an enlarged, fragmentary perspective view of the second locking mechanism of the data transfer apparatus coacting with the first locking mechanism for normally holding the apparatus in the state of FIGS. 1 through 4, the second locking mechanism incorporating the shutter opening lever seen in FIG. 12.

The second locking mechanism 44 coacts as aforesaid with the first locking mechanism 42 for normally holding the cartridge cradle 34 in the retracted position of FIGS. 2 and 3. The second locking mechanism 44 is seen in FIGS. 1, 2, 5 and 6 and is shown on an enlarged scale in FIG. 14. In this particular embodiment, we have utilized as a part of the second locking mechanism a lever that has heretofore been used for opening the shutter 52, FIGS. 9, 10 and 12, of the disk cartridge 36. Seen at 116, the shutter opening lever is mounted via a pivot pin 118 on the web 78 of the cartridge cradle 34 for pivotal motion about an axis parallel to the axis of the drive hub 70 of the disk drive mechanism 22. A torsion spring 120, FIG. 1, energizes the shutter opening lever 116 in a counterclockwise direction, normally into abutment against one of the side walls 80 of the cartridge cradle 34. The shutter opening lever 116 is therefore normally held in the position of FIGS. 1 and 14.

Figure 9:
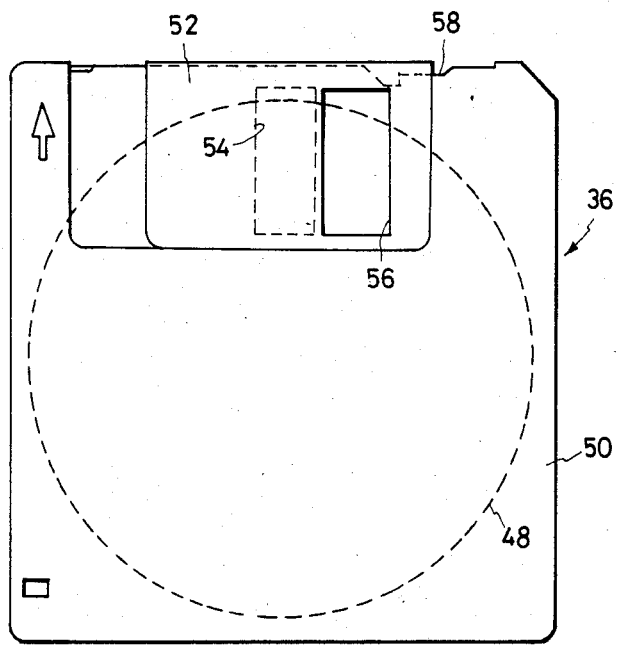
FIG. 9 is a top plan view of the disk cartridge for use with the data transfer apparatus of FIGS. 1 through 8, the disk cartridge being of the type having a magnetic disk with a metal made hub, and a relatively rigid envelope with an openable shutter.
Figure 10:
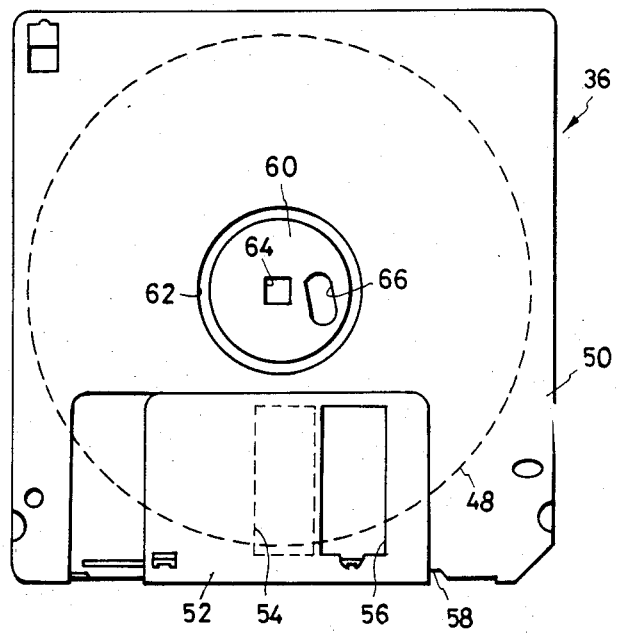
FIG. 10 is a bottom plan view of the disk cartridge of FIG. 9.
Figure 11:
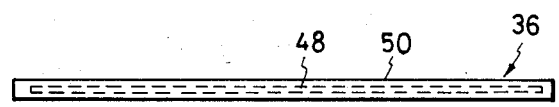
FIG. 11 is an edge elevation of the disk cartridge of FIGS. 9 and 10.
Figure 12:
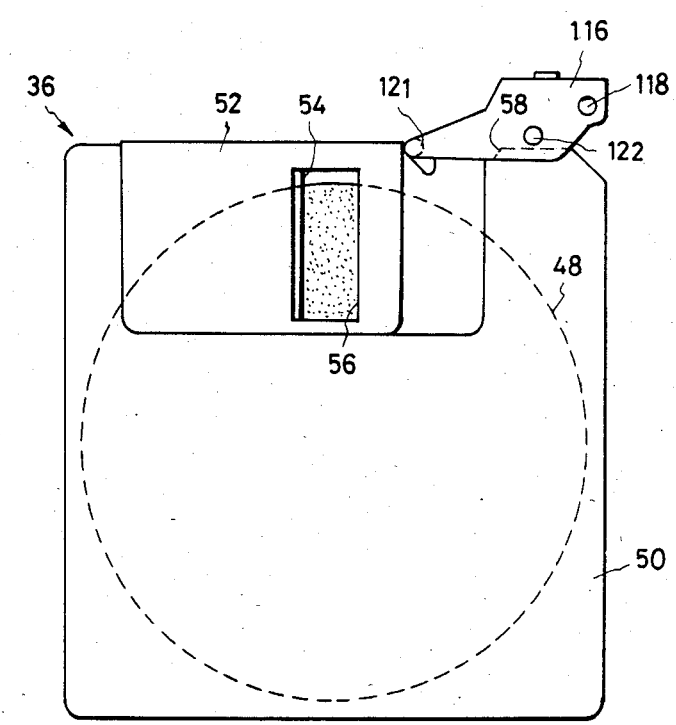
FIG. 12 is a view similar to FIG. 9 except that the shutter of the disk cartridge is shown opened by the shutter opening lever forming a part of the data transfer apparatus of FIGS. 1 through 8.

An abutment 121 depends from the free end of the shutter opening lever 116 for engagement in the recess 58, FIGS. 9, 10 and 12, of the disk cartridge 36 upon loading thereof on the cartridge cradle 34. With the abutment 121 thus engaged in the recess 58, the shutter opening lever 116 turns clockwise from its FIGS. 1 and 14 position to that of FIG. 5 against the force of the torsion spring 120 upon full insertion of the disk cartridge 36 in the cartridge cradle 34, thereby opening the disk cartridge shutter 52 as best pictured in FIG. 12.

Formed in the shutter opening lever 116 is a hole 122 which is normally out of register with a fixed prop or strut 124 extending upwardly from the base structure 20 and substantially held endwise against the underside of the shutter opening lever. When the shutter opening lever 116 is turned to its FIG. 5 position against the bias of the torsion spring 120, the hole 122 therein comes into register with the prop 124 and so receives the same with appropriate clearance, so that the cartridge cradle 34 becomes movable with the shutter opening lever from its FIGS. 2 and 3 position to that of FIGS. 6 and 7.

It will have been understood that we have well adapted the shutter opening lever 116 for normally positively locking the cartridge cradle 34 in the retracted position of FIGS. 2 and 3. Only when pivoted fully to its FIG. 5 position in opposition to the force of the torsion spring 120 upon loading of the disk cartridge 36, the shutter opening lever 116 conditions the cartridge cradle 34 for travel to its working position of FIGS. 6 and 7.

Head Transport Mechanism

Figure 15:
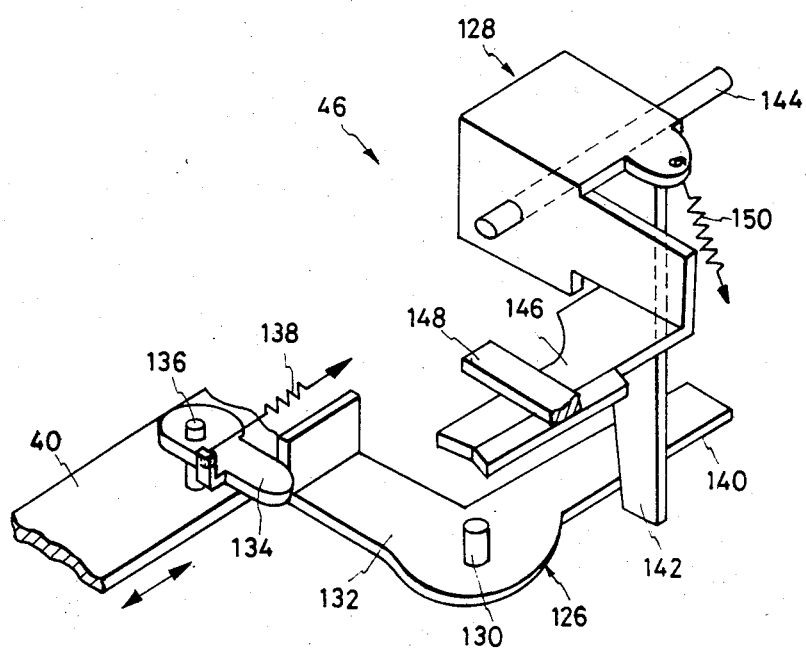
FIG. 15 is an enlarged, fragmentary perspective view of the head transport mechanism of the data transfer apparatus.

While the head transport mechanism 46 is seen in FIGS. 1, 2, 5 and 6, we have illustrated its details in FIG. 15 on an enlarged scale. The head transport mechanism 46 links the slide 40 of the cradle transport mechanism 38 to the head carrier 30 carrying the upper magnetic head 26, normally holding the upper magnetic head away from the lower magnetic head 24 against the force of the cantilever spring 32.

With particular reference to FIG. 15, the head transport mechanism 38 comprises first 126 and second 128 head transport levers for causing the up and down travel of the upper magnetic head 26 in response to the motion of the slide 40. The first head transport lever 126 takes the form of a bell crank, medially supported by a pivot pin 130 on the base structure 20 for pivotal motion about an axis parallel to the axis of the drive hub 70 of the disk drive mechanism 22. A first arm 132 of the first head transport lever 126 is arranged for abutting engagement with an engaging member 134 on the slide 40 of the cradle transport mechanism 38 at least when the slide is in the position of FIG. 1. The engaging member 134 is pivotally pinned at 136 on the slide 40 and is energized by a helical tension spring 138 in a counterclockwise direction for yieldable abutment against the first head transport lever arm 132 when the slide 40 is in the FIG. 1 position. The counterclockwise turn of the engaging member 134 is limited in the angular position of FIG. 5 by a suitable stop, not shown, on the slide 40. Accordingly, in the illustrated embodiment, the engaging member 134 moves out of engagement with the first arm 132 of the first head transport lever 126 upon travel of the slide 40 to the FIG. 5 position. A second arm 140 of the first head transport lever 126 butts on a depending arm 142 of the second head transport lever 128.

The second head transport lever 128 is mounted on a fixed pivot pin 144 extending horizontally, at right angles with the pivot pin 130 of the first head transport lever 126. In addition to the arm 142 in engagement with the first head transport lever 126, the second head transport lever 128 has another arm 146 extending parallel to its pivot pin 144 and underlying an arm 148 which is anchored to and projecting laterally from the head carrier 30. A helical tension spring 150 urges the second head transport lever 128 in a clockwise direction as viewed in FIG. 15.

When the slide 40 of the cradle transport mechanism 38 is held in the FIG. 1 position by the first locking mechanism 42, with no disk cartridge 36 loaded on the cartridge cradle 34, the engaging member 134 holds the first head transport lever 126 pivoted fully in a clockwise direction under the force of the tension spring 138. The first head transport lever 126 when in that angular position holds the second head transport lever 128 pivoted fully in a counterclockwise direction against the force of the tension spring 150, as shown in FIG. 2. So pivoted, the second head transport lever 128 raised with its arm 146 the arm 148 on the head carrier 30 against the force of the cantilever spring 32, thereby holding the upper magnetic head 26 away from the lower magnetic head 24, as will be seen also from FIG. 2.

When the slide 40 travels from its FIG. 1 to FIG. 5 position upon tripping of both first 42 and second 44 locking mechanisms due to the loading of the disk cartridge 36 on the cartridge cradle 34, the engaging member 134 on the slide moves out of abutting engagement with the arm 132 of the first head transport lever 126. Thereupon the first head transport lever 126 allows the second head transport lever 128 to be pivoted clockwise, as viewed in FIG. 15, under the bias of the tension spring 150. Thus the arm 146 of the second head transport lever 128 allows the head carrier 30 to travel downwardly under the bias of the cantilever spring 32, with the consequent establishment of data transfer contact of both magnetic heads 24 and 26 with the opposite faces of the magnetic disk of the loaded disk cartridge 36.

OPERATION

The data transfer apparatus is in the state of FIGS. 1 through 4 prior to the loading of the disk cartridge 36. Held away from the lower magnetic head 24, the upper magnetic head 26 is now dually locked against accidental engagement with the lower magnetic head by the first 42 and second 44 locking mechanisms. Even though the first locking mechanism 42 may be accidentally unlocked as by vibrations or shocks, as has been the case heretofore, the second locking mechanism 44 will remain operative to hold the cartridge cradle 34 substantially in the retracted position of FIGS. 2 and 3.

As illustrated in FIG. 3, the disk cartridge 36 may be inserted, with its shutter end foremost, in the cartridge cradle 34 in a direction at right angles with the axis of the drive hub 70 of the disk drive mechanism 22. The leading end of the inserted disk cartridge 36 will first hit the depending abutment 121 of the shutter opening lever 116 which forms a part of the second locking mechanism 44. The abutment 121 will become engaged in the recess 58 in the disk cartridge envelope 50.

As the disk cartridge 36 is inserted further in the cartridge cradle 34, the shutter opening lever 116 will turn clockwise from its FIG. 1 position to that of FIG. 5 against the force of the torsion spring 120, thereby opening the shutter 52 as depicted in FIG. 12.

Also, when the shutter opening lever 116 turns to the FIG. 5 position, the hole 122 therein will come into register with the upstanding prop 124 on the base structure 20. Since the hole 122 in the shutter opening lever 116 is shaped and sized to allow the prop 124 to pass upwardly therethrough, the shutter opening lever becomes movable downwardly with the cartridge cradle 34, as well as with the disk cartridge 36 loaded thereon, to the working position of the cartridge cradle best shown in FIGS. 6 and 7. The second locking mechanism 44 is thus tripped.

The insertion of the disk cartridge 36 in the cartridge cradle 34 will result also in the tripping of the first locking mechanism 42 as the disk cartridge turns the locking lever 104 clockwise from its FIG. 1 position to that of FIG. 5 against the force of the torsion spring 112 via the abutment 114. So released from the locking lever 104, the slide 40 of the cradle transport mechanism 38 will travel from its FIGS. 1 and 3 position to that of FIGS. 5 and 7 under the forces of the pair of tension springs 102.

The slide 40 is provided with the retarder mechanism 101 of FIGS. 1 and 5. This retarder mechanism makes it possible for the slide 40 to travel to the FIGS. 5 and 7 position at a controlled rate and noiselessly.

Figure 8:
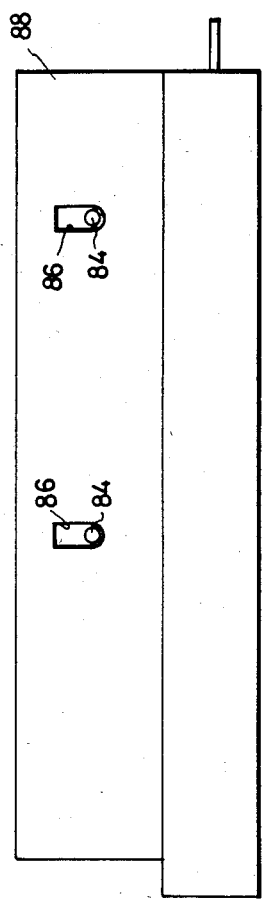
FIG. 8 is a view similar to FIG. 4 except that the apparatus is shown in a state when a magnetic disk cartridge, not shown here, is loaded in position therein.

Upon rightward travel of the slide 40 from its FIG. 3 position, the two pairs of cam grooves 100 in its side walls 92 will cause the cam follower pins 84 on the side walls 80 of the cartridge cradle 34 to slide down along the cam grooves, the cam follower pins being constrained to up and down motion by the guide slots 86, FIGS. 4 and 8, in the guide walls 88 on the base structure 20. Thus the cartridge cradle 34 moves from its FIGS. 2 and 3 position down to that of FIGS. 6 and 7 together with the disk cartridge 36 loaded thereon. The drive hub 70 of the disk drive mechanism 22 will engage the driven hub 60 of the magnetic disk 48 in driving relationship upon transportation of the disk cartridge 36 to the working position of the cartridge cradle 34.

The head transport mechanism 46 also responds to the displacement of the slide 40 from its FIGS. 1 and 3 position to that of FIGS. 5 and 7. As will be best understood from FIG. 15, the above displacement of the slide 40 will result in the pivotal motion of the first head transport lever 126 in a counterclockwise direction, and of the second head transport lever 128 in a clockwise direction, under the force of the tension spring 150 acting on the latter. Then, energized by the cantilever spring 32, the head carrier 30 will move the upper magnetic head 26 into engagement with the magnetic disk 48, thereby establishing the data transfer contact of both magnetic heads 24 and 26 with the opposite faces of the magnetic disk. As the slide 40 travels slowly from its FIGS. 1 and 3 position to that of FIGS. 5 and 7 owing to the retarder mechanism 101, so will the upper magnetic head 26 into data transfer contact with the magnetic disk 48. The establishment of the data transfer contact between magnetic heads 24 and 26 and magnetic disk 48 must take place in a timed relation with the travel of the cartridge cradle 34 from its retracted to working position. Such timing may be determined through adjustment of the working interrelationship between the two head transport levers 126 and 128.

Data transducing operation between magnetic heads 24 and 26 and magnetic disk 48 can be conventional. Accordingly, we consider it unnecessary to describe such operation in any detail.

For the ejection of the disk cartridge 36, the operator may push the eject knob 98 to move the slide 40 integral therewith from its FIGS. 5 and 7 position to that of FIGS. 1 and 3. Then the cam follower pins 84 on the cartridge cradle 34 will slide up along the cam grooves 100 in the side walls 92 of the slide 40, so that the cartridge cradle will return to the retracted position of FIGS. 2 and 3. The locking lever 104 of the first locking mechanism 42 will reengage the pin 110 on the slide 40 upon return of the latter to the FIGS. 1 and 3 position. Further, as the cartridge cradle 34 is cammed up to its retracted position, the shutter opening lever 116 of the second locking mechanism 44 will disengage the prop 124 on the base structure 20 and so will be sprung back to the FIGS. 1 and 14 position. Thus will the upper magnetic head 26 be again dually locked against accidental engagement with the lower magnetic head 24. Still further, on its return to the FIGS. 1 and 3 position, the slide 40 will turn the first head transport lever 126 in a clockwise direction, as seen in FIG. 15, thereby causing the second head transport lever 128 to pivot in a counterclockwise direction against the force of the tension spring 150. Then the upper magnetic head 26 will return to its FIG. 2 position against the force of the cantilever spring 32.

The preferred form of the data transfer apparatus in accordance with our invention, set forth hereinbefore, gains the following advantages in addition to those already described in the summary of the invention:

1. The upper magnetic head 26 is moved into and out of engagement with the magnetic disk by the head transport mechanism 46 comprising the two levers 126 and 128 responsive to the operation of the cradle transport mechanism 38. This arrangement is preferable to a solenoid or equivalent means that might make the apparatus more complex and expensive in construction.

2. The descent of the upper magnetic head 26 in response to the displacement of the slide 40 of the cradle transport mechanism 38 is braked by the retarder mechanism 101 to mitigate the impact of its engagement with the magnetic disk 48 and hence to avoid possible destruction of both heads 24 and 26 as well as of the magnetic disk.

3. Even if both first 42 and second 44 locking mechanisms are tripped accidentally for some reason or other, the retarder mechanism 101 will function to prevent or reduce the damage of both heads 24 and 26 due to their direct collision with each other.

Although we have shown and described the data transfer apparatus of our invention in terms of but one preferred embodiment thereof, we recognize that our invention is not to be limited to the exact details of the disclosed embodiment but is susceptible to a variety of modifications or alterations within the broader scope due to the invention. The following, then, is a brief list of such possible modifications or alterations that will readily occur to the specialists:

1. The data transfer apparatus could be adapted for use with a disk cartridge of the type having a flexible magnetic disk having a diameter of 76 millimeters and with a plastic hub attached centrally thereto. The plastic hub of the magnetic disk is of course to be mechanically clamped onto a drive hub or spindle that may be coupled directly to an electric drive motor.

2. A pneumatic damper could be employed in lieu of the oil damper 107 of the retarder mechanism 101.

3. The second locking mechanism 44 might not be structurally associated with the shutter opening lever 116; that is, the shutter opening lever could be used solely for opening the shutter of the disk cartridge, and a separate mechanism could be employed for normally locking the cartridge cradle in the retracted position.

4. The upper magnetic head might be displaced perpendicular to the plane of the magnetic disk, instead of being pivoted on the head carriage as in the illustrated embodiment.

5. Both magnetic heads might be moved relative to the magnetic disk into and out of data transfer contact therewith.

What we claim is:

1. A data transfer apparatus for use with a disk cartridge having a magnetic disk rotatably housed in a protective envelope therefor, comprising:
   (a) a base structure;
   (b) a disk drive mechanism on the base structure for imparting rotation to the magnetic disk of the disk cartridge, the disk drive mechanism including a drive hub rotatable about a predetermined axis in driving engagement with the magnetic disk;
   (c) a pair of magnetic transducer heads arranged substantially opposite each other, normally with a spacing therebetween, for data transfer contact with the opposite faces of the magnetic disk of the disk cartridge, at least one of the transducer heads being movable toward and away from the other transducer head into and out of data transfer contact with the magnetic disk;
   (d) a cartridge cradle mounted on the base structure for movement between a first position, where the disk cartridge is to be loaded on and unloaded from the cartridge cradle in a direction at right angles with the axis of rotation of the drive hub of the disk drive mechanism, and a second position where the drive hub of the disk drive mechanism makes driving engagement with the magnetic disk of the loaded disk cartridge;
   (e) a cradle transport mechanism for moving the cartridge cradle between the first and second positions, the cradle transport mechanism including resilient means biasing the cartridge cradle from the first toward the second position;
   (f) a first locking mechanism acting on the cradle transport mechanism for normally holding the cartridge cradle in the first position against the bias of the resilient means, the first locking mechanism being adapted to be tripped in response to the loading of the disk cartridge on the cartridge cradle;
   (g) a second locking mechanism acting directly on the cartridge cradle for normally holding the same in the first position, the second locking mechanism being also adapted to be tripped in response to the loading of the disk cartridge on the cartridge cradle; and
   (h) a head transport mechanism for causing at least one of the transducer heads to move toward the other transducer head, and hence for establishing data transfer contact of the transducer heads with the opposite faces of the magnetic disk of the loaded disk cartridge, when the cartridge cradle travels with the disk cartridge from the first to the second position upon tripping of both the first and the second locking mechanisms;

(i) whereby the head transport mechanism holds the pair of transducer heads away from each other unless both the first and the second locking mechanisms are tripped.

2. The data transfer apparatus as recited in claim 1, wherein the envelope of the disk cartridge has a shutter which is openable to expose radial portions of the opposite faces of the magnetic disk for data transfer contact with the pair of transducer heads, wherein the cartridge cradle moves between the first and second positions in the axial direction of the drive hub of the disk drive mechanism, and wherein the second locking mechanism comprises:
   (a) a shutter opening lever mounted on the cartridge cradle for pivotal motion about an axis parallel to the axis of the drive hub of the disk drive mechanism, the shutter opening lever being pivoted in a predetermined direction in response to the loading of the disk cartridge on the cartridge cradle for opening the shutter of the disk cartridge; and
   (b) a prop fixedly mounted on the base structure and substantially held against the shutter opening lever for preventing the cartridge cradle from moving with the shutter opening lever from the first to the second position until the shutter opening lever completes the opening of the shutter of the disk cartridge.

3. The data transfer apparatus as recited in claim 2, wherein the shutter opening lever of the second locking mechanism is sprung in a direction to eject the disk cartridge from the cartridge cradle.

4. The data transfer apparatus as recited in claim 1, wherein the cartridge cradle is constrained to linear travel between the first and second positions in the axial direction of the drive hub of the disk drive mechanism, and wherein the cradle transport mechanism comprises:
   (a) a slide mounted on the base structure for movement between a third and a fourth position in a direction at right angles with the axis of the drive hub of the disk drive mechanism and biased by the resilient means from the third toward the fourth position, the slide being normally held in the third position by the first locking mechanism against the bias of the resilient means; and
   (b) cam means connecting the slide to the cartridge cradle for causing the latter to move from the first to the second position upon movement of the slide from the third to the fourth position under the bias of the resilient means.

5. The data transfer apparatus as recited in claim 4, wherein the first locking mechanism comprises:

(a) a locking lever mounted on the base structure for pivotal motion about an axis parallel to the axis of the drive hub of the disk drive mechanism, the locking lever being movable into and out of engagement with the slide of the cradle transport mechanism and effective to hold the slide in the third position against the bias of the resilient means when engaged therewith; and
   (b) second resilient means urging the locking lever into engagement with the slide, the locking lever being adapted to be moved out of engagement with the slide against the force of the second resilient means by the disk cartridge loaded on the cartridge cradle.

6. The data transfer apparatus as recited in claim 4, further comprising a retarder mechanism for retarding the travel of the slide of the cradle transport mechanism from the third to the fourth position under the bias of the first recited resilient means.

7. The data transfer apparatus as recited in claim 6, wherein the retarder mechanism comprises:
   (a) a rack movable with the slide of the cradle transport mechanism;
   (b) a pinion in mesh with the rack; and
   (c) a fluid damper coupled to the pinion.

8. The data transfer apparatus as recited in claim 4, wherein one of the magnetic transducer heads is mounted to a head carrier which is supported by second spring means effective to bias said one transducer head toward the other transducer head, and wherein the head transport mechanism comprises:
   (a) a first head transport lever mounted on the base structure for pivotal motion about an axis parallel to the axis of the drive hub of the disk drive mechanism, the first head transport lever being operatively engaged with the slide of the cradle transport mechanism, at least when the slide is in the third position, thereby to be pivoted in a predetermined direction;
   (b) a second head transport lever pivotable about a fixed axis at right angles with the axis of the drive hub of the disk drive mechanism and adapted to be operatively engaged with the first head transport lever and with the head carrier;
   (c) the first and second head transport levers coacting to hold said one transducer head away from the other transducer head against the bias of the second spring means when the slide is in the third position, and to cause said one transducer head to move toward the other transducer head under the bias of the second spring means when the slide moves from the third toward the fourth position.

* * * * *